June 22, 1937.  E. J. FRASER  2,084,842
CONDUIT COUPLER CLOSURE MEANS
Filed June 12, 1936
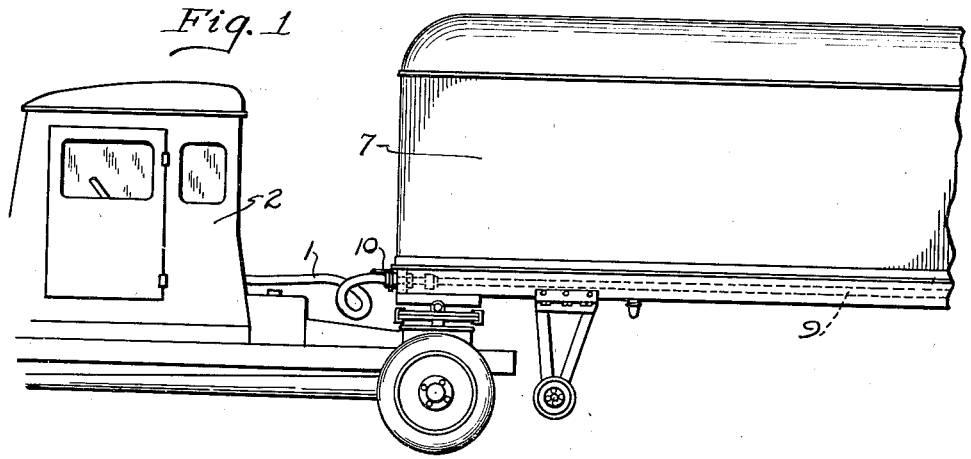
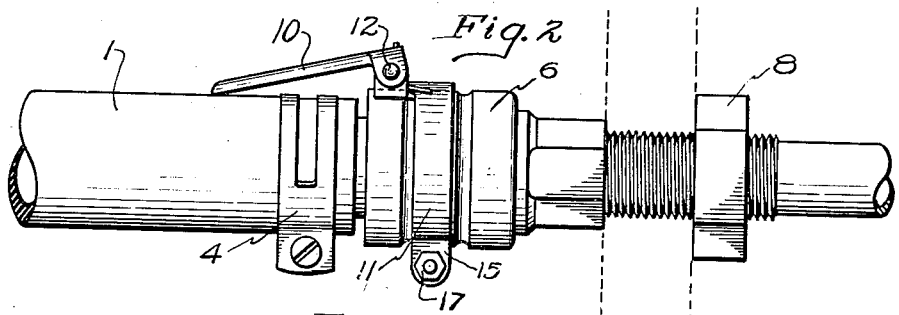
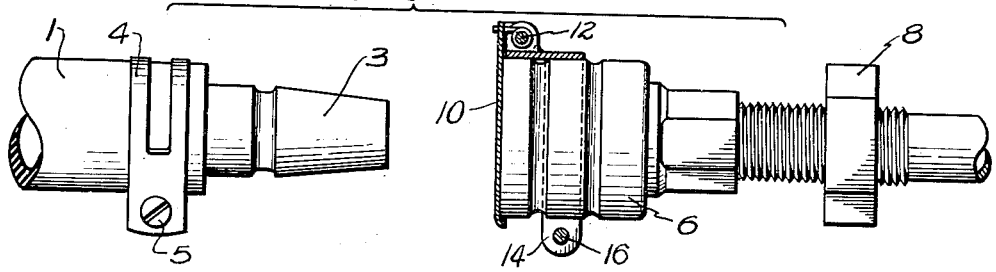
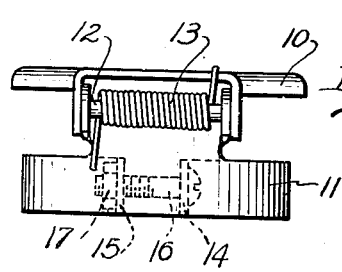
Inventor
Edwin J. Fraser
by Rummler, Rummler & Woodworth
Attys.

Patented June 22, 1937

2,084,842

UNITED STATES PATENT OFFICE 2,084,842

CONDUIT COUPLER CLOSURE MEANS

Edwin J. Fraser, Riverside, Ill., assignor to Keeshin Motor Express Co. Inc., Chicago, Ill., a corporation of Illinois Application June 12, 1936, Serial No. 84,859

2 Claims. (Cl. 284—4)

This invention relates to improvements in automatic closure means for coupler units used in connection with air brake systems of trailers and tractors.

Demountable trailers are usually equipped with air pressure brakes or vacuum actuated brakes, the air for which is supplied or exhausted as the case may be, by suitable means located in the tractor. A flexible conduit having a coupler unit is usually suspended between the tractor and trailer for conducting the air from the tractor to the trailer brake system. When the tractor is disconnected from the trailer, this flexible conduit is also disconnected by breaking the joint at the coupler unit.

The trailer, even when separated from the tractor, is usually out of doors at all times, so that the coupler ends are exposed and the trailer air brake conduit subject to weather elements, and also dirt, dust, cinders, stones, etc. It can readily be seen that the trailer brake system is thus likely to become inoperative because of the foreign matter settling therein and, therefore, requires constant repair and cleaning.

The tractor is usually either in operation or placed in a garage so that the conduit leading from the air or vacuum tank is rarely exposed long enough to collect any foreign matter. It was to eliminate the cumulation of foreign matter in the trailer air brake conduit that this invention was devised.

The main objects of this invention are to provide an automatic closure means for a coupler unit used in connection with brake systems of trailers and tractors; to provide an inexpensive automatic closure means of this type which snugly seats on the face end of the female member of a coupling unit; and to provide a device of this type which is simple in construction and operation and having no parts which will readily break or get out of working order.

An illustrative embodiment of this invention is shown in the accompanying drawing in which:

Figure 1 is a fragmentary side view of a trailer and tractor in operative position.

Fig. 2 is a side view of a coupler unit in operating position and showing the automatic closure means in open or inoperative position; the conduits being shown broken away.

Fig. 3 is a side view partly in section showing the coupler unit separated and the closure means in closed or operative position.

Fig. 4 is a side view of the closure means detached from the female member of the coupling unit and taken in the same position as that shown in Fig. 3 only that the female member of the coupling unit is removed.

Demountable trailers are usually equipped with air brakes for braking the speed and stopping the road wheels of trailers. In order to supply or exhaust air for such braking action, a flexible conduit 1, usually reinforced rubber tubing or the like, is connected at one end to either an air or vacuum tank (not shown) located in the tractor 2, and is connected at its other end to the male member 3 of a coupling unit. The male member 3 is secured to the conduit 1 by means of a clamp 4 which is provided with a machine screw 5 for tightening the clamp. The female member 6 of the coupling unit is semi-permanently secured by means of lock nut 8 to the forward, lower edge crossbeam of the trailer body 7. The member 6 is arranged to communicate with the air brake conduit 9 which feeds the air to or exhausts the air from the air brakes (not shown) of the trailer 7.

The automatic closure means is arranged to be semi-permanently secured to the female member 6 of the coupler unit and comprises a cover plate 10 hingedly secured to a clamping member 11 by a pivot pin 12. A coiled torsion spring 13 is wound about the pin 12 and one end of the spring bears against the clamping member 11 and the other end of the spring is disposed in a notch formed in the cover plate, adjacent the point of hinged connection and bears against the cover plate so as to normally hold it in closed position, as shown in Fig. 3.

The clamping member 11 is cut out of a piece of sheet metal and bent so that it is cylindrical. The ends 14—15 of the clamping member 11 are bent upwardly to form a pair of registering ears which are perforated to admit a bolt 16. The clamping member will be secured in position on the female member 6 by threading the nut 17 tight onto the bolt 16 in the usual manner.

In operation the cover plate, being normally held down tightly on the face of the exposed end on the female member of the coupling is manually lifted outwardly to expose the opening in the female member and the male member is then inserted therein.

The inner face of the cover plate will then bear against the air hose, see Fig. 2. When the coupling unit is disconnected, it can readily be seen that the cover plate will automatically close, covering the exposed end of the female member and thereby keep all foreign matters from entering the trailer air brake conduit.

Although but one specific embodiment of the present invention has been shown and described in connection with its attachment to the female member of the coupling unit, it can readily be seen that by changing minor details of the construction, a similar closure means may be secured to the male member and that certain of the details shown and described may be altered or omitted without departing from the spirit of the invention as defined by the following claims.

I claim:

1. A system of the class described comprising a tractor and a trailer equipped with airbrake apparatus including a compressed air supply tube on the tractor and an air receiving tube on the trailer, said tubes having mutually complementary connectors designed for coaxial rectilinear connection, the connector on the tractor being formed and adapted to project axially into the other, and the latter having a plain annular face substantially perpendicular to the main axis of the connector and being provided with an automatic closure therefor of weather, dust and gravel proof design and comprising a spring closed laterally hinged leaf adapted for ready manual opening and lateral positioning to accommodate insertion of the first described connector, and said leaf being formed and adapted to fit snugly over and to close the second described connector when restored by its spring upon disconnection of said connectors.

2. In a device of the class described, the combination with a coupler unit for airbrake conduits of trailers and tractors, comprising a pair of axially aligned complementary interfitting male and female members, the open end of said female member having a plain annular face substantially perpendicular to the axis thereof, of a closure means comprising a clamping band arranged to be secured on said female member adjacent its open end and provided with a pair of ears, a cover plate hingedly connected to said ears and cooperating with said face, and a torsion spring arranged between said cover plate and clamping band for automatically seating said cover plate on the face of the exposed end of said female member when the members of the coupler unit are separated.

EDWIN J. FRASER.